US011356623B2

(12) United States Patent
Kwong et al.

(10) Patent No.: US 11,356,623 B2
(45) Date of Patent: Jun. 7, 2022

(54) SYSTEM AND METHOD FOR PROCESSING AN IMAGE

(71) Applicant: City University of Hong Kong, Kowloon (HK)

(72) Inventors: Sam Tak Wu Kwong, Quarry Bay (HK); Chongyi Li, Kowloon (HK)

(73) Assignee: City University of Hong Kong, Kowloon (HK)

( * ) Notice: Subject to any disclaimer, the term of this patent is extended or adjusted under 35 U.S.C. 154(b) by 222 days.

(21) Appl. No.: 16/889,074

(22) Filed: Jun. 1, 2020

(65) Prior Publication Data

US 2021/0377468 A1 Dec. 2, 2021

(51) Int. Cl.
*H04N 5/355* (2011.01)
*G06N 3/04* (2006.01)
*G06N 3/08* (2006.01)

(52) U.S. Cl.
CPC ............... *H04N 5/355* (2013.01); *G06N 3/04* (2013.01); *G06N 3/08* (2013.01)

(58) Field of Classification Search
CPC ............ G06N 3/04; G06N 3/08; H04N 5/355; H04N 9/646; H04N 9/69
See application file for complete search history.

(56) References Cited

U.S. PATENT DOCUMENTS

| | | | |
|---|---|---|---|
| 7,643,035 B2 | 1/2010 | Toyama et al. | |
| 9,374,589 B2 | 6/2016 | Ten et al. | |
| 10,104,388 B2 | 10/2018 | Ikeda et al. | |
| 10,116,938 B2 | 10/2018 | Minoo et al. | |
| 2005/0024508 A1* | 2/2005 | Okisu | H04N 1/4072 348/E5.079 |
| 2008/0077001 A1* | 3/2008 | Ruscio | G16H 30/40 600/407 |
| 2013/0127980 A1* | 5/2013 | Haddick | G06F 3/013 348/14.08 |
| 2013/0239057 A1* | 9/2013 | Ubillos | G06F 3/0485 715/833 |

(Continued)

FOREIGN PATENT DOCUMENTS

| | | |
|---|---|---|
| CN | 102779334 | 1/2015 |
| CN | 105933617 | 8/2018 |

(Continued)

OTHER PUBLICATIONS

Gabriel Eilertsen, "HDR image reconstruction from a single exposure using deep CNNs," Nov. 20, 2017, ACM Transactions on Graphics, vol. 36, No. 6, Article 178., pp. 178:1-178:10.*

(Continued)

*Primary Examiner* — Omar S Ismail
(74) *Attorney, Agent, or Firm* — Renner Kenner Greive Bobak Taylor & Weber

(57) ABSTRACT

A system and method for processing an image including the steps of receiving an input image having a plurality of pixels, wherein each of the plurality of pixels have one or more pixel characteristics; and processing the input image to generate an enhanced image by applying a pixel/image relationship to each of the plurality of pixels of the input image, wherein the pixel/image relationship is arranged to adjust the one or more pixel characteristics of each of the plurality of pixels of the input image.

37 Claims, 7 Drawing Sheets

(56) References Cited

U.S. PATENT DOCUMENTS

| | | | |
|---|---|---|---|
| 2013/0278631 A1* | 10/2013 | Border | G06Q 30/02 345/633 |
| 2016/0261793 A1* | 9/2016 | Sivan | H04N 5/23218 |
| 2017/0374390 A1 | 12/2017 | Leleannec et al. | |
| 2019/0051680 A1* | 2/2019 | Hanzawa | H04N 5/35518 |
| 2019/0074307 A1* | 3/2019 | Kita | H04N 5/369 |
| 2019/0325567 A1* | 10/2019 | Jones | G06K 9/6267 |

FOREIGN PATENT DOCUMENTS

| | | |
|---|---|---|
| JP | 6484347 | 3/2019 |
| KR | 101831551 | 2/2018 |
| WO | 2012118961 | 9/2012 |

OTHER PUBLICATIONS

D. Marnerides, "ExpandNet: A Deep Convolutional Neural Network for High Dynamic Range Expansion from Low Dynamic Range Content," May 22, 2018, Computer Graphics Forum vol. 37, Issue 2, pp. 39-45.*

Chao Dong, "Image Super-Resolution Using Deep Convolutional Networks," Jun. 1, 2015, IEEE Transactions on Pattern Analysis and Machine Intelligence, vol. 38, No. 2, pp. 300-305.*

Siyeong Lee, "Deep Recursive HDRI: Inverse Tone Mapping using Generative Adversarial Networks," Sep. 2018, Proceedings of the European Conference on Computer Vision (ECCV), 2018, pp. 1-13.*

Paul E. Debevec, "Recovering High Dynamic Range Radiance Maps from Photographs," Aug. 11, 2008, SIGGRAPH '08: ACM SIGGRAPH 2008 classes Aug. 2008 Article No. 31, pp. 1-9.*

Z. Wei, et al., "Local inverse tone mapping for scalable high dynamic range image coding", IEEE Trans. Circuits Syst. Video Technol., vol. 28, No. 2, pp. 550-555, Feb. 2018.

M. Le Pendu, et al., "Local inverse tone curve learning for high dynamic range image scalable compression", IEEE Trans. Circuits Syst. Video Technol., vol. 24, No. 12, pp. 5753-5763, Dec. 2015.

F. Durand and J. Dorsey, "Fast bilateral filtering for the display of high-dynamic-range images", in Proc Siggraph, San Antonio, Texas, 2002, pp. 257-266.

Y. Endo, et al., "Deep reverse tone mapping", ACM Trans. Graph, vol. 36, No. 6, pp. 177:1-10, Nov. 2017.

G. Eilertsen, et al., "HDR image reconstruction from a single exposure using deep CNNs", ACM Trans. Graph, vol. 36, No. 6, pp. 178:1-15 Nov. 2017.

* cited by examiner

SYSTEM AND METHOD FOR PROCESSING AN IMAGE

TECHNICAL FIELD

The present invention relates to a system and method for processing an image, and particularly, although not exclusively, to a system and method for enhancing images or image signals.

BACKGROUND

The capturing, viewing and processing of photographs, videos and other images are common activities amongst photographers, media producers or social media users. With commonly accessible image or video capturing equipment such as digital cameras, action cameras or smart devices (e.g. smartphones) with cameras, images and videos have become a common and expected form of media for communications and the sharing of ideas or knowledge between different people.

Despite advances in photography and the use of photographic equipment, environmental conditions may nonetheless limit the quality of the videos or images captured in real world conditions. Insufficient lighting is a problem that users suffer, which in turn causes degradations in visibility, brightness, contrast and details. In turn, when environmental conditions turn undesirable, such as in low light conditions or in environments where there are strong variations in lighting conditions, a video or image that is captured by a user may appear to be aesthetically poor or undesirable.

Similarly, due to the widespread usage of image capturing or image broadcasting equipment, there is a large variety of specifications between the different equipment used by individual users. In turn, a high quality image may have been captured by a user with equipment of a superior specification, but when it is broadcast or viewed by another end user with equipment that has an inferior or different specifications, the image or video may in turn be presented poorly or of a lesser quality due to the limitations of the transmission or display equipment.

SUMMARY OF THE INVENTION

In accordance with a first aspect of the present invention, there is provided a method for processing an image comprising the steps of:
  receiving an input image having a plurality of pixels, wherein each of the plurality of pixels have one or more pixel characteristics; and,
  processing the input image to generate an enhanced image by applying a pixel/image relationship to each of the plurality of pixels of the input image, wherein the pixel/image relationship is arranged to adjust the one or more pixel characteristics of each of the plurality of pixels of the input image.

In an embodiment of the first aspect, the pixel/image relationship is associated with a relationship between the one or more of characteristics of each of the plurality of pixels of the input image and a visual presentation of the input image.

In an embodiment of the first aspect, the one or more characteristics of each of the plurality of pixels are associated with the exposure levels of each of the plurality of pixels.

In an embodiment of the first aspect, the pixel/image relationship includes a mapping of the one or more characteristics of each of the plurality of pixels relative to the one or more characteristics of each of the other pixels of the input image.

In an embodiment of the first aspect, the exposure levels include tones, contrasts or color shifts of the pixel.

In an embodiment of the first aspect, by applying the pixel/image relationship to each of the plurality of the pixels of the input image, a dynamic range of the input image is adjusted.

In an embodiment of the first aspect, the pixel/image relationship is applied iteratively to each of the plurality of pixels are processed to generate the enhanced image.

In an embodiment of the first aspect, the pixel/image relationship includes at least one adjustable parameter arranged to adjust a magnitude of the application of the pixel/image relationship to each of the plurality of pixels.

In an embodiment of the first aspect, the magnitude of the application of the pixel/image relationship applies to the one or more characteristics of each of the plurality of pixels.

In an embodiment of the first aspect, the at least one adjustment parameter is adjustable by a learning network.

In an embodiment of the first aspect, the learning network is a convolution neural network (CNN).

In an embodiment of the first aspect, the learning network is trained with a reference data set.

In an embodiment of the first aspect, the learning network is trained with one or more image quality loss processes.

In an embodiment of the first aspect, the one or more image quality loss processes include spatial consistency loss, exposure control loss, color constancy loss, illumination smoothness loss or any combination thereof.

In an embodiment of the first aspect, the one or more image quality loss processes are used when the reference data set is not available.

In an embodiment of the first aspect, the image/pixel relationship is represented by $F(I(x);\alpha)=I(x)+\alpha I(x)(1-I(x))$ where
  x denotes the pixel coordinates,
  $F(I(x);\alpha)$ is the enhanced image,
  $I(x)$, $\alpha \in [-1,1]$ is the adjustable parameter and wherein each pixel is normalized to $[0,1]$.

In an embodiment of the first aspect, the spatial consistency loss is represented by $$L_{spa} = \frac{1}{K}\sum_{i=1}^{K}\sum_{j\in\Omega(i)}(\|Y_i - Y_j\| - \|I_i - I_j\|)^2$$

where K is the number of cantered region i, $\Omega(i)$ is the four neighboring regions cantered at the region i. Y and I represent an average intensity value of a local region in the enhanced result and input image, respectively.

In an embodiment of the first aspect, the exposure loss control is represented by:

$$L_{exp} = \frac{1}{M}\sum_{k=1}^{M}\|Y_k - E\|$$

where M represents the number of nonoverlapping local regions, Y is the average intensity value of a local region in the enhanced image.

In an embodiment of the first aspect, the color Constancy Loss is represented by $$L_{col} = \sum_{\forall (p,q) \in s} (J^p - J^q)^2, \varepsilon = \{R, G, B\}$$

where $J^p$ denotes the average intensity value of p channel of the enhanced result, (p,q) represents a pair of color channel.

In an embodiment of the first aspect, the illumination smoothness loss is represented by $$L_{tv\alpha} = \frac{1}{N}\sum_{n=1}^{N}\sum_{c \in s}(\nabla_x \alpha_n^c + \nabla_y \alpha_n^c)^2, \varepsilon = \{R, G, B\}$$

where N is the number of iterations, a is the curve parameter map, $\nabla_x$ and $\nabla_y$ represent the horizontal and vertical gradient operations.

In an embodiment of the first aspect, the input image is a SDR signal and the enhanced image is a HDR signal.

In accordance with a second aspect of the present invention, there is provided a system for processing an image comprising:
an image gateway arranged to receive an input image having a plurality of pixels, wherein each of the plurality of pixels have one or more pixel characteristics; and,
an enhancement engine arranged to process the input image to generate an enhanced image by applying a pixel/image relationship to each of the plurality of pixels of the input image, wherein the pixel/image relationship is arranged to adjust the one or more pixel characteristics of each of the plurality of pixels of the input image.

In an embodiment of the second aspect, the pixel/image relationship is associated with a relationship between the one or more characteristics of each of the plurality of pixels of the input image and a visual presentation of the input image.

In an embodiment of the second aspect, the one or more characteristics of each of the plurality of pixels are associated with the exposure levels of each of the plurality of pixels.

In an embodiment of the second aspect, the pixel/image relationship includes a mapping of the one or more characteristics of each of the plurality of pixels relative to the one or more characteristics of each of the other pixels of the input image.

In an embodiment of the second aspect, the exposure levels include tones, contrasts or color shifts of the pixel.

In an embodiment of the second aspect, by applying the pixel/image relationship to each of the plurality of the pixels of the input image, a dynamic range of the input image is adjusted.

In an embodiment of the second aspect, the pixel/image relationship is applied iteratively to each of the plurality of pixels are processed to generate the enhanced image.

In an embodiment of the second aspect, the pixel/image relationship includes at least one adjustable parameter arranged to adjust a magnitude of the application of the pixel/image relationship to each of the plurality of pixels.

In an embodiment of the second aspect, the magnitude of the application of the pixel/image relationship applies to the one or more characteristics of each of the plurality of pixels.

In an embodiment of the second aspect, the at least one adjustment parameter is adjustable by a learning network.

In an embodiment of the second aspect, the learning network is a convolution neural network (CNN).

In an embodiment of the second aspect, the learning network is trained with a reference data set.

In an embodiment of the second aspect, the learning network is trained with one or more image quality loss processes.

In an embodiment of the second aspect, the one or more image quality loss processes include spatial consistency loss, exposure control loss, color constancy loss, illumination smoothness loss or any combination thereof.

In an embodiment of the second aspect, the one or more image quality loss processes are used when the reference data set is not available.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
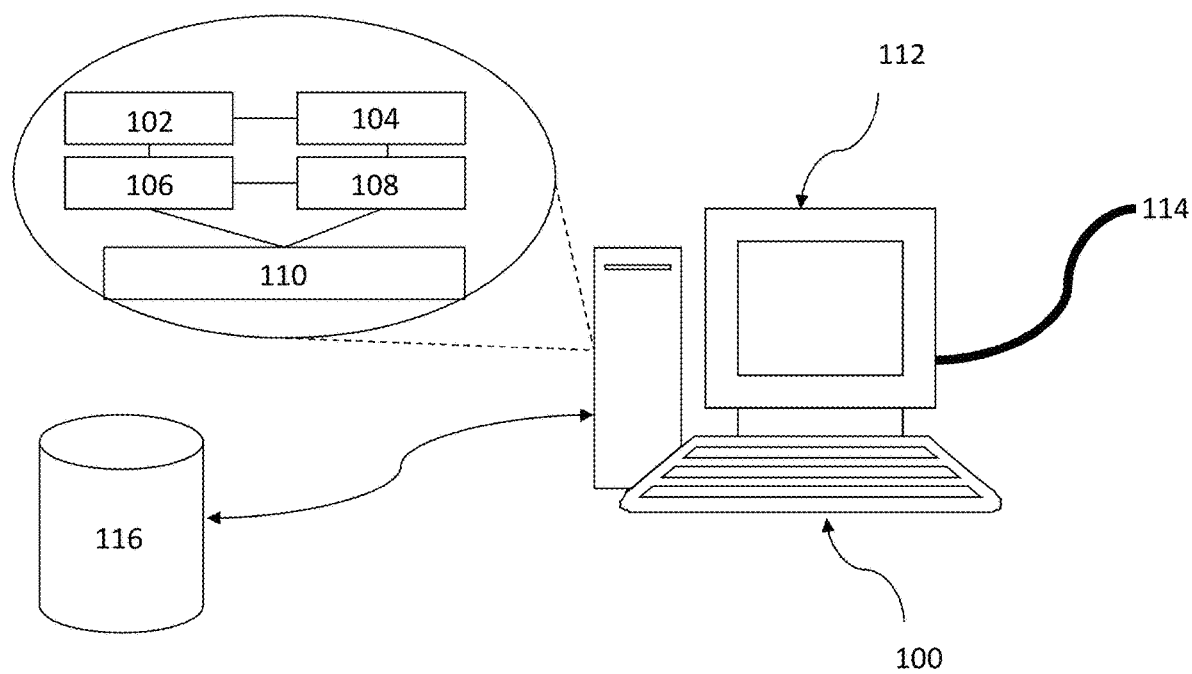
FIG. 1 is a schematic diagram of a computer system arranged to operate as a system for processing an image in accordance with one embodiment of the present invention.

Referring to FIG. 1, there is illustrated a computing device 100 which is arranged to be implemented to provide a method for processing an image comprising the steps of: -receiving an input image having a plurality of pixels, wherein each of the plurality of pixels have one or more pixel characteristics; and, -processing the input image to generate an enhanced image by applying a pixel/image relationship to each of the plurality of pixels of the input image, wherein the pixel/image relationship is arranged to adjust the one or more pixel characteristics of each of the plurality of pixels of the input image.

In this embodiment, the method for processing an image is arranged to operate on a computer system or computing device so as to receive an image, either as a single image in an image file or signal or as an image from a stream of images such as a video or multimedia recording from an image source into an enhanced image. The computer or computer system may be any type of computer, such as a personal computer, computer server, portable computer, tablet computer, smart phones or a computer system integrated with other devices such as cameras, televisions, communications/broadcasting equipment. The image source may also be a camera module, a communications gateway, an image signal broadcaster/receiver or a storage device, either remote or local.

As shown in FIG. 1, there is illustrated a schematic diagram of a computing device which in this embodiment is a computer server 100. The server 100 comprises suitable components necessary to receive, store and execute appropriate computer instructions. The components may include a processing unit 102, read-only memory (ROM) 104, random access memory (RAM) 106, and input/output devices such as disk drives 108, input devices 110 such as an Ethernet port, a USB port, etc. Display 112 such as a liquid crystal display, a light emitting display or any other suitable display and communications links 114. The server 100 includes instructions that may be included in ROM 104, RAM 106 or disk drives 108 and may be executed by the processing unit 102. There may be provided a plurality of communication links 114 which may variously connect to one or more computing devices such as a server, personal computers, terminals, wireless or handheld computing devices. At least one of a plurality of communications link may also be connected to an external computing network through a telephone line or other type of communications link.

The server 100 may include storage devices such as a disk drive 108 which may encompass solid state drives, hard disk drives, optical drives or magnetic tape drives. The server 100 may use a single disk drive or multiple disk drives. The server 100 may also have a suitable operating system 116 which resides on the disk drive or in the ROM of the server 100.

Figure 2:
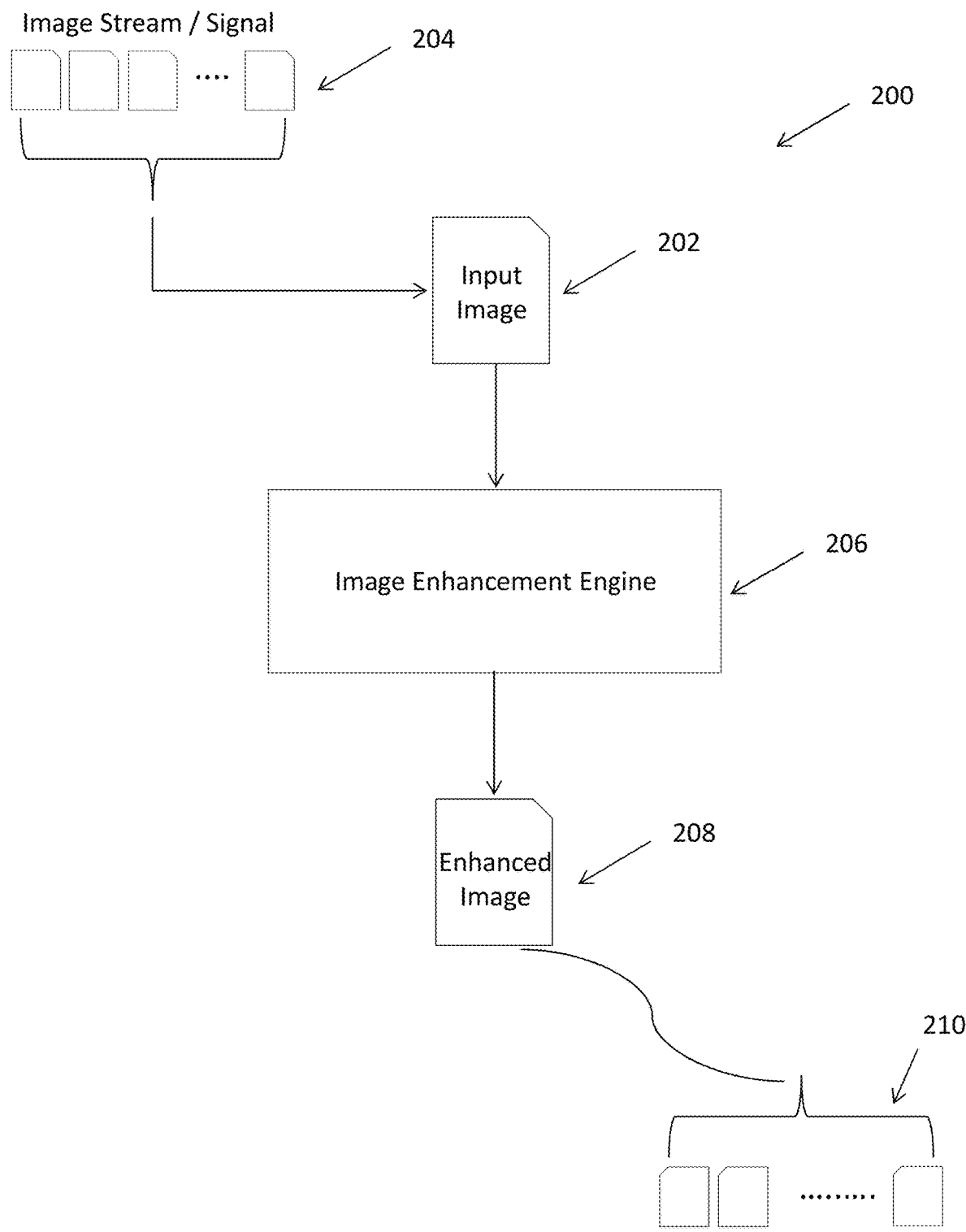
FIG. 2 is a block diagram illustrating an embodiment of a system for processing an image.

The server 100 is arranged to have instructions, in the form of software, hardware or a combination of both which may be executed by the server to provide an example of method for processing an image. The server, when arranged to have these instructions may then operate as a system for processing images as shown in FIG. 2. Embodiments of the server 100, may be implemented to process an image file or signal, and may be implemented as a computer or as a dedicated processing device which can operate in a smart phone or together with image acquiring or broadcasting equipment such as cameras or image broadcasting systems or television screens.

The computer server 100, which may also be implemented on a standalone computer, portable computer, smart device, or as a logical computing circuit that operates with an electronic or communication device is arranged to receive an input image or input image signal for processing. Once received, the input image or signal is then processed with an image enhancement engine which may be implemented on a computer or computer system in hardware, software or a combination of both. The image enhancement engine is arranged to operate an enhancement process, which may include, for example, a image manipulation process, on the input image to generate an enhanced image. This enhancement process may include the application of a pixel/image relationship to the input image. Embodiments of the pixel/image relationship will be described further below with reference to FIGS. 2 to 5, but in brief, the relationship represents a mapping relationship between the characteristics of each individual pixel of the input image against the entire input image itself. Accordingly, by formulating this relationship into a model or function that may be applied by a processor to process image data, adjustments to the characteristics of each individual pixel of the input image may be made so as to affect, and preferably enhance, the entire input image itself.

Preferably, the adjustment of the characteristics of each pixel within an image may include the adjustment of any characteristics of the pixel, such as lighting intensity or color. In turn, this may affect the exposure levels of one of the individual pixel of the input image. When this adjustment is made to all of the pixels in the image, and these combined adjustments are made based on the optimizing of the exposure levels or other characteristics of the pixel with respect to the entire image, then in turn, the image is enhanced and becomes an enhanced image. This example is particularly advantageous as images that may have been captured, stored or broadcast with a lower dynamic range can be processed and enhanced into one of higher dynamic range, allowing the image quality to be improved and made suitable for television or viewing screen with a higher specification that that of the capture, store or broadcasting equipment.

In some example embodiments of the image enhancement engine, by using an example of a pixel/image relationship, the enhancement engine may therefore be able to adjust the pixels of a standard dynamic range (SDR) image or signal so as to enhance the SDR image or signal into a high dynamic range (HDR) image or signal. This adjustment may be performed by increasing the dynamic range of the image through the enhancements performed which would allow details that could not be shown due to the image's dynamic range limitation to be shown after it has been enhanced. Examples of the pixel/image relationship will be described further below with reference to FIGS. 2 to 5.

With reference to FIG. 2, there is shown a system for processing an image 200 comprising:

an image gateway arranged to receive an input image 202 having a plurality of pixels, wherein each of the plurality of pixels have one or more pixel characteristics; and, an enhancement engine 206 arranged to process the input image 202 to generate an enhanced image 208 by applying a pixel/image relationship to each of the plurality of pixels of the input image, wherein the pixel/image relationship is arranged to adjust the one or more pixel characteristics of each of the plurality of pixels of the input image.

In this embodiment, the system is firstly arranged to receive an input image 202 from an image source such as a camera or any image stream 204 or storage device. This input image may exist as an image file, an image data stream or a signal. Once an input image 202 is received via a gateway (not shown) of the system 200 which is any device or communication port arranged to communicate with the image source, the input image 202 is processed by an enhancement engine 206 so as to enhance the image into an enhanced image 208, which may be a stand-alone image 208 or part of an enhanced image stream 210.

In the examples described below, the enhancement engine 206 may take many forms, but in this embodiment, the enhancement engine 206 uses a pixel/image relationship arranged to map each pixel's characteristics to the overall image itself, and whereby adjustment to these pixel's characteristics with respect to the pixel/image relationship allows the overall image to be manipulated or adjusted visually. One such adjustment to the image may be to the exposure level of the image, which when performed in an optimized manner, may in turn manipulate the image to achieve a greater dynamic range. This in turn allows under exposed details to be displayed or revealed to a user, whilst details lost or washed out in over exposed portions of the image may also be adjusted such that is visible to the user.

The adjustment to the pixel's characteristics with respect to the pixel/image relationship may also be optimized by use of machine learning tools and/or loss correction methods. In this example, a learning network is used to perform this adjustment and thereby, when the learning network is adequately trained, the adjustment would therefore be made to each of the pixels in the image to enhance the image. Preferably, the learning network may also be arranged to either learn from training referenced data sets or where reference data sets are not available, by use of one or more image quality loss functions. Examples of the learning network are further described below with reference to FIGS. 3 to 5.

Figure 3:
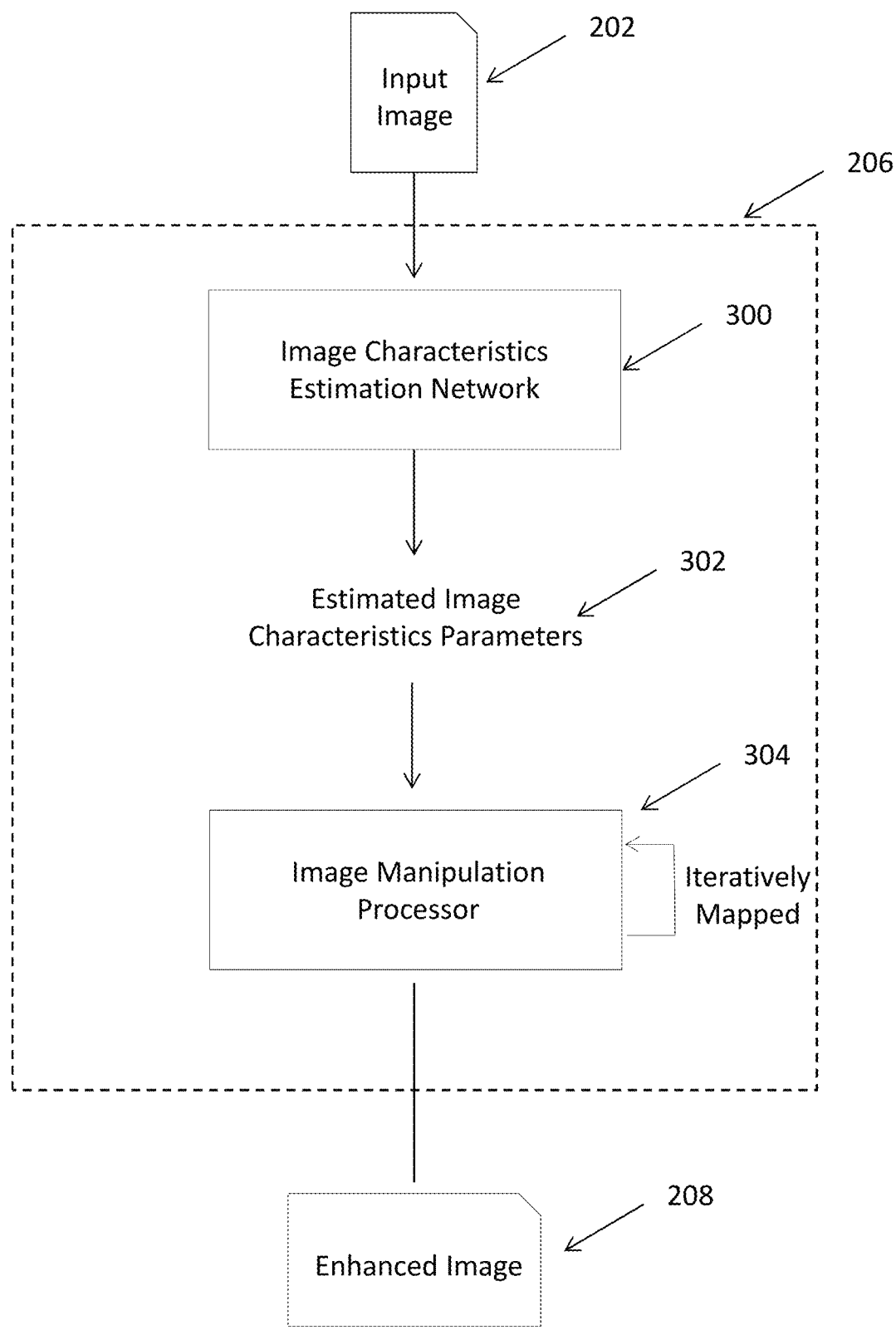
FIG. 3 is a block diagram illustrating an embodiment of the image enhancement engine of FIG. 2.

With reference to FIG. 3, there is illustrated a block diagram of an example image enhancement engine. In this embodiment, the image enhancement engine 206, or enhancement engine is arranged to process an input image 202 so as to output an enhanced image 208. The enhanced image 208 would therefore represent an image that would be the input image 202 but having its image characteristics improved. This improvement may include, for example, enhancing the exposure level of the image and/or expanding the dynamic range of the image. In turn, this may improve the appearance of the image by showing greater clarity or details.

In one embodiment, the image enhancement engine 206 may be used to convert standard dynamic range (SDR) signal to high dynamic range (HDR) signal by use of machine learning (e.g. deep learning) based methods. However, so as to accommodate for situations where there are no references for supervised training, which may occur in various practical deployments where training data is difficult to collect, the image enhancement engine 206 may also be arranged to operate without any reference data or references for supervise learning.

Preferably, the enhancement engine 206 includes an image manipulation processor 304 which applies a pixel/image relationship on an input image so as to enhance the input image. The pixel/image relationship characterizes a relationship between a pixel's characteristics and the entire image (comprising a totality of all of the pixels within the image) itself. This relationship, in some examples, represents an interdependent or correlating function between one pixel of the input image and its effect on the rest of the image such that when the characteristics of this pixel is adjusted in any way with respect to this relationship, the image characteristics of the entire image, including its aesthetic appearances may also change.

Preferably, and as the inventors have devised, examples of the pixel/image relationship may be presented mathematically, or visualized, as a "curve" or in an embodiment, as a parameter-adjustable quadratic curve. In turn, this curve may be used, to convert a SDR signal to a HDR signal. Preferably, this relationship or curve may also consider the value ranges, curve monotonicity, and gradient backpropagation in Convolutional Neural Networks (CNNs) such that it can be adjusted by changing the values of specific parameters within the curve. Examples of this quadratic curve may also progressively approximate higher-order curves by iteratively applying itself, thus it can obtain better capability of adjusting the dynamic range of an image.

The pixel/image relationship may be arranged to include at least one adjustable parameter which can be adjusted to determine how the relationship can be applied on to the image to generate a desired effect. This parameter may also be adjusted by a learning network such as by a lightweight CNN which may be designed to learn the pixel-wise and best-fitting curve parameters when only the SDR signal (images or videos) are used for training. In turn, when the learning network is able to adjust the application of the relationship on an image by estimating the necessary parameters, the characteristics of the image will change either to improve its appearance via adjustments to various characteristics such as exposure levels, dynamic range, contrast, saturations, etc. Once the learning network is trained to perform such optimizing adjustments, it will therefore be able to adjust the parameters to apply the relationship onto an input image with improvements to the appearance of the image.

In situations where there is an inadequate amount of training data to perform any significant training of the learning network, one or more image quality loss functions, which may be non-reference based image quality loss functions or image quality assessment loss functions, may also be used to drive the best-fitting curve parameters learning without references. In this regard, experimental results performed by the inventors on the enhancement engine show that the engine 206, and when it is used in a system for processing an image 200, may effectively implement the conversion from SDR signal to HDR signal on synthetic and real SDR signal in qualitative and quantitative metrics. Furthermore, the enhancement engine 206 is also fast for practical applications (e.g. 500 FPS) and can convert SDR signal to HDR signal for displaying on HDR TVs in real time, which can improve the quality of displays of older media on modern screens.

As shown in FIG. 3, the enhancement engine 206 includes an image characteristics estimation network 300 arranged to provide an estimate of image characteristics parameters 302 that may be used to best process the input image so as to enhance the image in accordance with a pixel/image relationship. These parameters may also be referred to (as earlier mentioned) as best fitting curve parameters or parameters. The parameters 302 estimated will be based on each an input image 202 and every input image is likely to have its own set of estimated parameters 302.

Once these image characteristics parameters 302 are estimated, the image characteristics parameters 302 are then inputted into an image manipulation process 304 which would in turn start and control the application of a pixel/image relationship to each of the pixels of the input image to generate an enhanced image. This application process of the pixel/image relationship may also be performed iteratively (306) so as to obtain a preferred or optimized enhanced image 208 and uses the estimated parameters 302 to determine how the pixel/image relationship is applied to the individual pixel concerned.

As shown in this example, an input image 202, which may be in the form of an SDR signal (or any other image or a frame from a stream of images such as a video), is first forwarded to the image characteristics estimation network 300 to estimate a set of best-fitting parameters 302 for applying the image/pixel relationship. These parameters 302 may also be referred to as the estimated image characteristics parameter or "curve parameters" where the image/pixel relationship is referred to as a curve, would then determine how the image/pixel relationship is applied onto the pixel concerned so as to attempt to provide the best enhancement of the input image.

The image manipulation process 304 proceeds to use the estimated image characteristics parameters 302 or curve parameters and apply the pixel/image relationship in accordance with these parameters to the input image or signal. In one example, the input pixels of the RGB channels are mapped to the enhanced level by iteratively (306) applying the image/pixel relationship that would operate as a "mapping curve". Examples of this embodiment relationship or the "mapping curve", image characteristics parameter estimation network 300, and non-reference loss are further described below.

As described above, the pixel/image relationship may be a function or mathematical relationship which would map the relationship between the characteristics of each individual pixel of the image to the entire image as a whole. In an abstract comparison and to appreciate an example of this pixel/image relationship, one can compare the pixel/image relationship with the "curves" that may be found in certain "curve adjustment tool" as found in some advanced computerized photo editing systems. In these curve adjustment tools, a user may be able to manipulate a curve which is plotted out against an image histogram and in turn manipulate the appearance of the image by tuning various characteristics, such as contrast, exposure, lighting effects, saturation of colors etc. There are many effects of the curve adjustment tool, but in general, the discrete adjustment of the curve by a user may alter the exposure of some portions of the image and in turn, when manipulated by a user, using the image as a feedback, the user can "tune" the exposure, lighting, contrast and visible level of detail of the image as the user pleases so as to present the most aesthetical optimal image.

In this regard, the pixel/image relationship is comparable in an abstract sense to this "curve" in the curve adjustment tool, as its manipulation, preferably, by automation and not human intervention, would also allow the exposure or other image characteristics, to be adjusted and optimized. In this regard, the pixel/image relationship may be able to map a low-light image to its enhanced version automatically and that the pixel/image relationship is solely dependent on the input image. Nonetheless, it should be appreciated by persons skilled in the art that the pixel/image relationship described herein is fundamentally different in all aspects when compared with examples of the curve adjustment tools found in photo editing systems as the pixel/image relationship is devised by use of different variables with entirely different mathematically relationships and representations.

Preferably, in defining the pixel/image relationship, there are three objectives for of the pixel/image relationship. These are as follows:
1) each pixel value of the converted HDR signal should be in the normalized range, such as [0,1], which avoids the information loss induced by overflow truncation;
2) this relationship should be monotonous to preserve the differences of neighboring pixels;
3) the form of this relationship should be as simple as possible and meet the requirement of gradient back-propagation. For the brief description, an SDR image is taken as an example as follows.

To achieve these three objectives, an example of the image/pixel relationship may be represented mathematically as a quadratic curve which goes across zero and one points may be expressed as:

$$F(I(x);\alpha)=I(x)+\alpha I(x)(1-I(x)) \quad (1)$$

where
x denotes the pixel coordinates,
$F(I(x);\alpha)$ is the enhanced result (such as a corresponding HDR image) of an input SDR image,
I(x), $\alpha \in [-1,1]$ is the trainable curve parameter, which adjusts the magnitude of curve; and
Each pixel is normalized to [0,1] and all operations are pixel-wise.

Figure 3A:
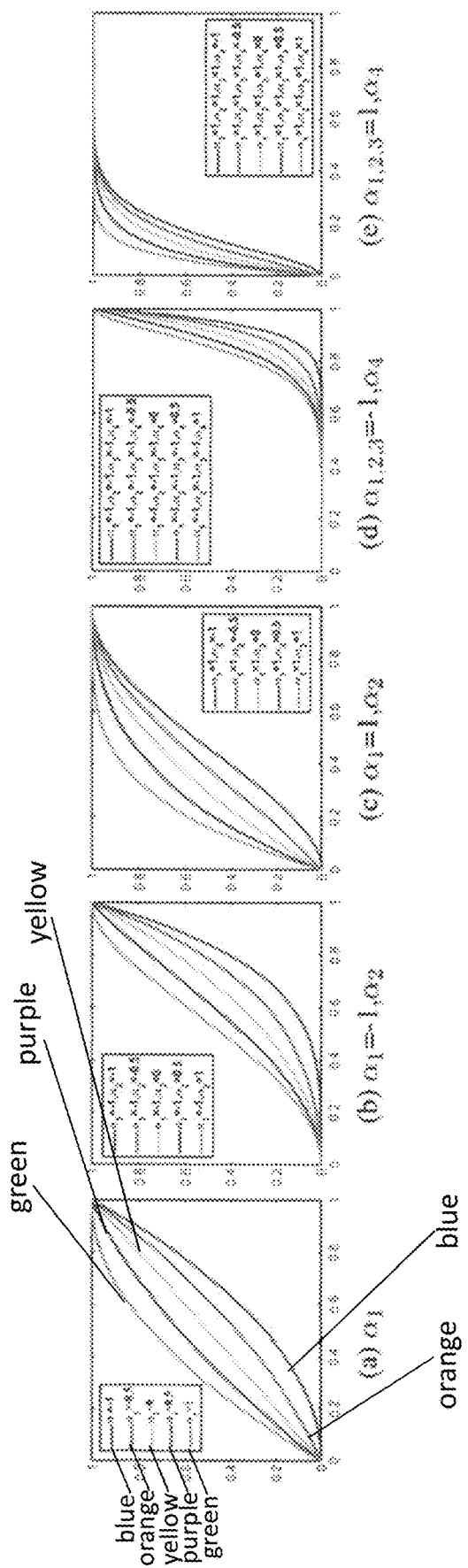
FIG. 3A shows diagrams (a) to (e) showing an example pixel/image relationship with different parameters and number of iterations.

With reference to FIG. 3A, there is shown a number of charts (a) to (e) showing the curves with different adjustment parameters $\alpha \in [-1,1]$ and the number of iterations $n \in \{1,2,3,4\}$. As shown in FIG. 3A, the form of curves is illustrated with different adjustment parameters a in FIG. 3A(a). The curve enables the capability of increasing and decreasing the dynamic ranges of input image, which is conducive to not only enhancing the dark or low light regions (e.g. SDR regions) but also avoiding the over-exposure artefacts.

In several challenging examples, this curve should have a more powerful adjustment capability. To the end, the higher-order curves are approximated by iteratively using the quadratic curve as follows:

$$F_n(x)=F_{n-1}(x)+\alpha_n F_{n-1}(x)(1-F_{n-1}(x)) \quad (2)$$

where
n is the number of iterations.
Eq. (2) can be reduced to Eq. (1) when n is set to 1.
In FIGS. 3(b)-(e), the higher-order curves with different a and n are presented. For example, the curve with n=4 and $\alpha_{1,2,3,4}=1$ as the green (g) curve shown in FIG. 3A(e) has more powerful adjustment capability than the basic LE-curve with $\alpha_1=1$ as the green (g) curve shown in FIG. 3(a). In one experiment example, the inventors set n to 8, which can deal with most of the cases.

Although such a higher-order curve can adjust the image in the large dynamic range, it is still a global adjustment since the a is used for all pixels. The global mapping tends to over/under enhance local regions. To solve this problem, the a is formulated as the pixel-wise parameter. It means each pixel of input image has a corresponding curve with the best-fitting a to adjust its dynamic range. Hence, the final a is a parameter map with the same size as the input image, and Eq. (2) can be further expressed as:

$$F_n(x)=F_{n-1}(x)+\alpha_n(x)F_{n-1}(x)(1-F_{n-1}(x)) \quad (3)$$

In this regard, the assumption is that the pixels in the local region have the same intensity (also the same adjustment curves); thus, the neighbouring pixels in the enhanced result still preserve the monotonous relations. In this manner, the higher-order curves also comply with the above-mentioned objectives. With the best-fitting maps, the enhanced result can be directly obtained by curve mapping.

Figure 3B:
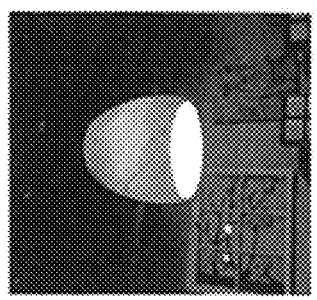
FIG. 3B shows images (a) to (e) showing examples of the best-fitting curve parameter maps of RGB channels.
Figure 3B:
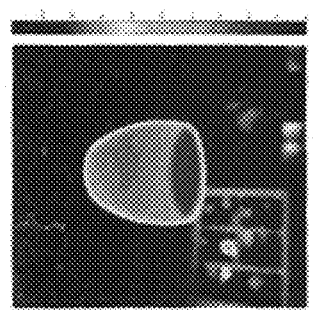
Figure 3B:
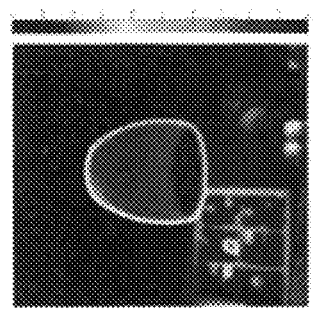
Figure 3B:
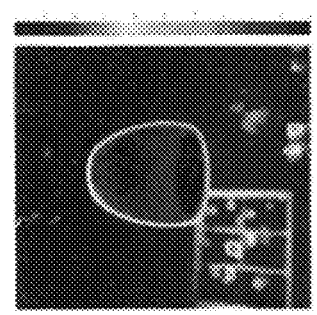
Figure 3B:
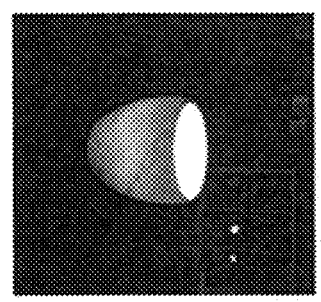

With reference to FIG. 3B, there is illustrated an example of an image characteristics parameter estimation network arranged to estimate a set of best-fitting curve parameter maps of three channels (R, B, G) of an input image 3B(a). As shown in FIG. 3B, the best-fitting parameter maps in different channels 3B(b), 3B(c), 3B(d) have similar adjustment tendency but different values. Moreover, the curve parameter map accurately indicates the brightness of different regions (e.g, the two glitters on the wall). With the best-fitting maps, the enhanced result can be directly obtained (e.g., FIG. 3B(e)) which reveals the content in the dark regions and well preserves the regions of light source.

Figure 4:
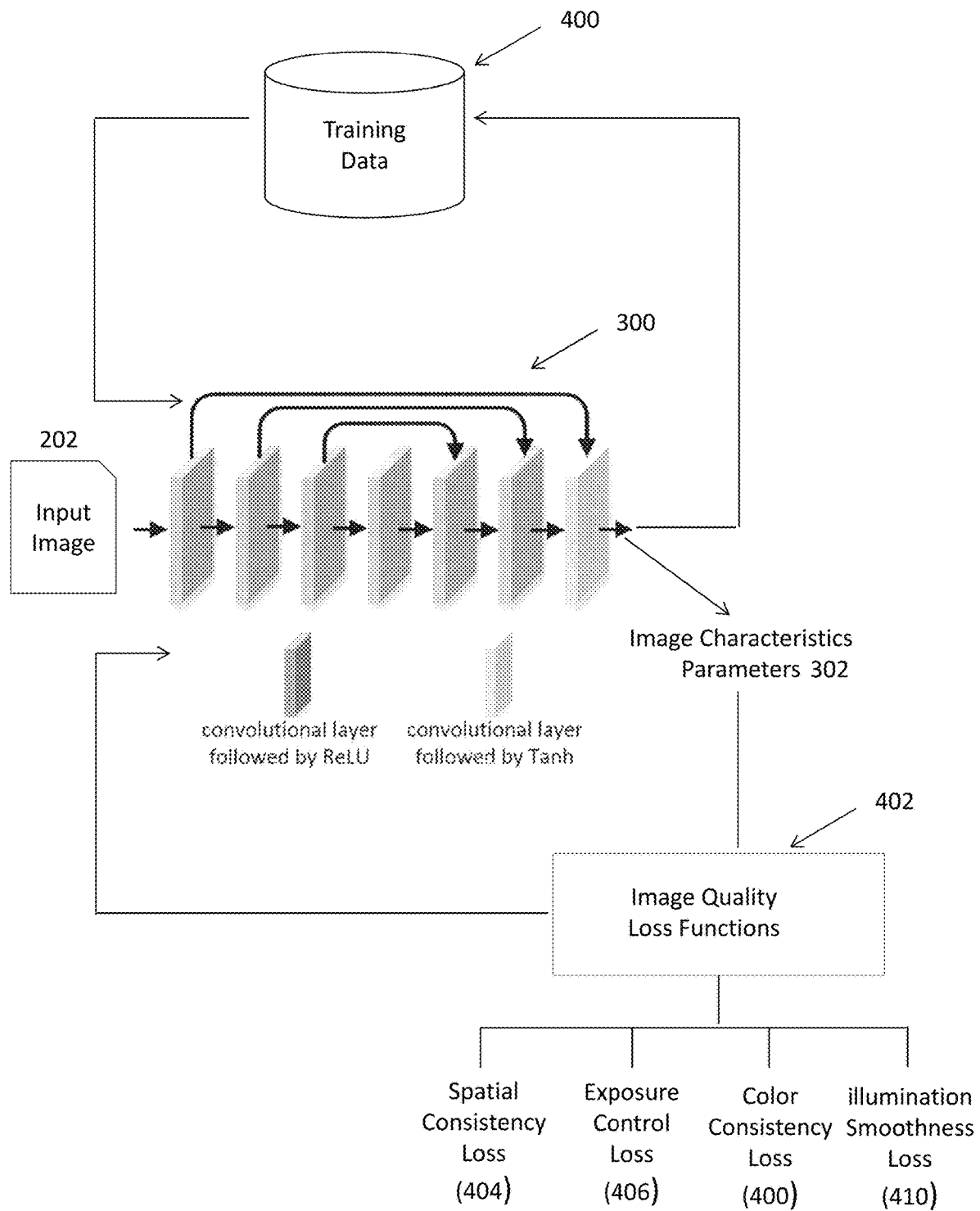
FIG. 4 is a block diagram illustrating an embodiment of the image characteristic parameters estimation network of FIG. 3.

With reference to FIG. 4, there is illustrated an example embodiment of image characteristics parameter estimation network 300 of FIG. 3. As described earlier, in order for the image manipulation processor 304 to apply the pixel/image relationship to each pixel of the input image, it is necessary to identify the parameters 302 which will be used to apply the pixel/image relationship to each pixel. Accordingly, in this example, to build the relations between the input image 202 and its optimized application of the pixel/image relationship, or as visualized as building the best-fitting curve parameter maps, an image characteristics parameter estimation network 300 (parameter estimation network) is used to estimate these parameters.

As shown in FIG. 4, the input to the parameter estimation network 300 is the input image 202, which may be an SDR image or signal while the outputs are a set of curve parameter maps for corresponding higher-order curves. With the curve parameter maps, the enhanced result (HDR image) can be obtained by using Eq. (3).

In one example, the parameter estimation network 300 is a learning network that can be trained. Preferably, instead of employing fully connected layers which require the fixed input sizes, a convolution neural network (CNN) for the estimation of curve parameter maps may be employed. The network 300 may not use the down-sampling and batch normalization layers which break the relations of neighboring pixels. An example of the detailed architecture of this curve parameter estimation network 300 is shown in FIG. 4. Specifically, in this example, only seven convolutional layers with symmetrical concatenation are used. Each layer consists of 32 convolutional kernels of size 3*3 and stride 1 followed by ReLU function. The last convolutional layer with Tanh function outputs 24 parameter maps according to the numbers of iteration (e.g., n=8 in one experiment), where each iteration requires 3 curve parameter maps for three channels. In turn, this network 300 may be trained with a reference dataset 400. However, a reference data set 400 may not always be available in which case, one or more image quality loss functions or image quality assessment loss functions 402 may be used to provide training to the network.

As illustrated in FIG. 4, there is the learning network has one or more image quality assessment loss functions 402 arranged to drive the learning of curve parameter estimation network 300. These loss functions 402 predict a loss or error for the estimate parameters 302 by assessing the image quality for specific quality losses after it has been adjusted by the image manipulation processor 304. In turn, the functions are able to provide a feedback mechanism to train the curve parameter estimation network 300. These loss functions 402 may include spatial consistency loss (404), exposure control loss (406), color constancy loss (408), and illumination smoothness loss (410). Each of these are described below.

Spatial Consistency Loss (404)

The enhanced result is expected to inherit the spatial consistency from the input image. In other words, the bright (dark) regions should keep relatively bright (dark) in the enhanced result. To implement the spacial consistency loss $L_{spa}$, the difference of neighboring regions in input and enhanced images is computed as:

$$L_{spa} = \frac{1}{K}\sum_{i=1}^{K}\sum_{j\in\Omega(i)}(\|Y_i - Y_j\| - \|I_i - I_j\|)^2 \quad (4)$$

where K is the number of cantered region i, $\Omega(i)$ is the four neighboring regions cantered at the region i. Y and I represent the average intensity value of the local region in the enhanced result and input image, respectively. The size of the local region is set to 4*4.

Exposure Control Loss (406)

To restrain the under/over-exposed regions, an exposure control loss is devised to control the exposure level. Firstly, the average intensity value in each nonoverlapping local region of the enhanced image is computed. Then the average intensity value subtracts a predefined well-exposedness level E. The exposure control loss $L_{exp}$ measures how close the average intensity value of the local region is close to the well-exposedness level, and can be expressed as:

$$L_{exp} = \frac{1}{M}\sum_{k=1}^{M}\|Y_k - E\| \quad (5)$$

where M represents the number of the nonoverlapping local region, Y is the average intensity value of a local region in the enhanced image. The size of the local region and well-exposedness level are set to 16*16 and 0.6, respectively.

Color Constancy Loss (408)

Following Gray-World color constancy hypothesis that color in each sensor channel averages to gray over the entire image, a color constancy loss is invented to correct the potential color deviations in the enhanced result and also build the relations among three channels separate adjustment. The color constancy loss $L_{col}$ is to ensure the average intensity values of RGB channels close, which can be expressed as:

$$L_{col} = \sum_{\forall(p,q)\in\varepsilon}(J^p - J^q)^2, \varepsilon = \{R, G, B\} \quad (6)$$

where $J^p$ denotes the average intensity value of p channel of the enhanced result, (p,q) represents a pair of color channel.

Illumination Smoothness Loss (410) To preserve the monotonicity relations between the neighboring pixels, an illumination smoothness loss to each curve parameter map α is invented. The illumination smoothness loss $L_{tv\alpha}$ is defined as:

$$L_{tv\alpha} = \frac{1}{N}\sum_{n=1}^{N}\sum_{c\in\varepsilon}(\nabla_x \alpha_n^c + \nabla_y \alpha_n^c)^2, \varepsilon = \{R, G, B\} \quad (7)$$

where N is the number of iterations, α is the curve parameter map, $\nabla_x$ and $\nabla_y$ represent the horizontal and vertical gradient operations.

The total loss is therefore a linear combination of the aforementioned losses:

$$L_{total} = L_{spa} + L_{exp} + W_{col}L_{col} + W_{tv\alpha}L_{tv\alpha} \quad (8)$$

Each of these image quality loss functions 402 may be used individually or in combination to provide a loss value that can be used to train the image characteristics estimation network 300, or any other machine learning tool or learning network that is used in its place.

In one example implementation, in order to perform the training process of the network 300, any low image quality image, such as an SDR image or video datasets can be used for training. Preferably, the training images are firstly resized to an example 512*512 although other alternative sizes also can be used. The system for processing an image 200 is implemented with computing device having a GPU. A batch-mode learning method with a batch size of 8 is applied. The filter weights of each layer are initialized with standard zero mean and 0.02 standard deviation Gaussian function. Bias is initialized as a constant.

An ADAM optimizer with default parameters and fixed learning rate 0.0001 may also be used for this network optimization. The weights $W_{col}$ and $W_{tva}$ are set to 0.5, and 20, respectively. With an GPU such as the (NVIDIA GTX 2080Ti GPU) as an example, the proposed framework can process an image with a size of 640*480 within 0.002 s (500 FPS).

The image quality loss functions 402 may be advantageous as they are able to consider the quality of the image from a number of different light or image related effects. In this regard, each specific function (404), (406), (408) and (410) has been tested by the inventors in their trials and experiments so as to identify and measure the manner in which each of these loss functions contribute to the enhancement of an image.

Figure 5:
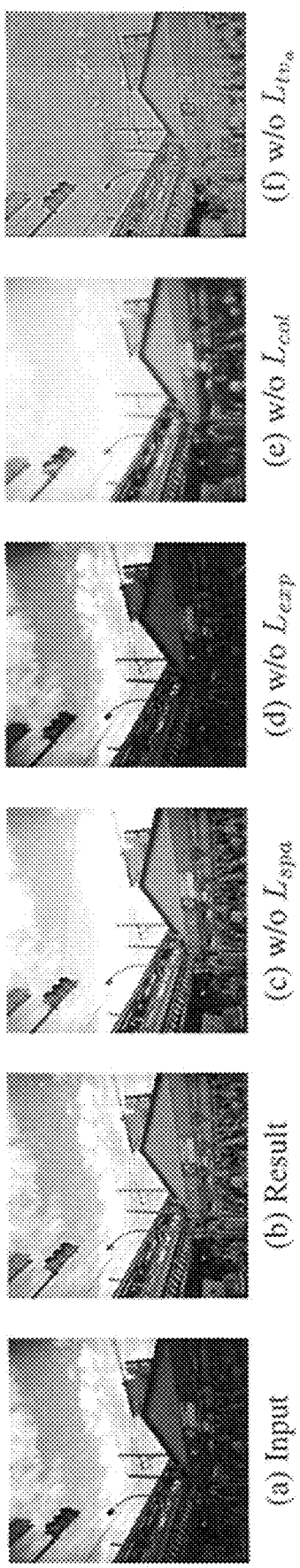
FIG. 5 shows images (a) to (f) showing an example enhancement of an input image without any one of image quality loss functions of FIG. 4.

With reference to FIG. 5, the results of combining various loss functions are shown. In these experiments, an image as shown in (a) is inputted into an example embodiment of a system for processing an image as described in FIGS. 2 to 4, with an enhanced image result of (b).

In this regard, the inventors performed an ablation experiment by removing each of the loss functions 402 whilst combining the remaining loss functions. As indicated in FIG. 5(a) to (e), when each loss function is selectively removed, the enhancement to the image suffers a specific effect which would render the enhancement to be poorly performed.

When compared with (b), (c) is the result without spatial consistency loss $L_{spa}$ (404) which shows it has relatively low contrast, such as the region of cloud, as without this loss function, the image losses the difference between neighboring regions existed in the input.

When removing the exposure control loss $L_{exp}$ (406), as shown in (d), the brightness of input has less change, which indicates the importance of exposure control loss for low-light image adjustment.

The result in (e) introduces color casts when the color constancy loss $L_{col}$ (408) is discarded. Such a framework ignores the relations between three channels when separately using curve mapping.

In (f), removing the illumination smoothness loss $L_{tva}$ (410) greatly damages the correlations between neighboring regions and thus introduces obvious artifacts.

The results in FIG. 5 would indicate that it is preferable to combine all of the loss functions (404), (406), (408) and (410) as the contribution of each function is clearly demonstrated in this experiment.

However, depending on the exact implementation, training set, learning network conditions and the input image itself, it is expected that not all of the loss functions (404), (406), (408) and (410) need to be used. In certain circumstances, one or a combination of any one or more of these functions, may also provide an acceptable level of performance.

Embodiments of the present invention may be advantageous for at least the various advantages.

(1) In a first aspect, the system provides for an example of a zero-reference learning framework for converting SDR signal to HDR signal. Additionally, it is independent on the paired and unpaired training data, and thus avoids the risk of overfitting on specific data. As a result, this framework generalizes to various SDR signal.

(2) The system provides for an example of an image/pixel relationship which may be represented by a quadratic curve. This curve may be able to approximate higher-order curves by iteratively applying itself. Instead of image reconstruction used in deep learning-based SDR signal to HDR signal approaches which may damage the intrinsic attributes of an input SDR signal, the devised image-specific curve can self-adaptively adjust SDR signal to its corresponding HDR signal by pixel-level mapping.

(3) The system also includes a learning network which operates as a lightweight curve parameter estimation network. The network is easy to trained (0.5 hours in example experiments) and fast for inference, which is suitable for practical applications.

(4) The learning network of the system is also able to avoid any reliance on reference data, a new task-specific non-reference loss function including spatial consistency loss, exposure control loss, color constancy loss, and illumination smoothness loss is devised.

(5) Accordingly, a zero-reference learning framework can be extended to other image processing tasks.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include standalone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for processing an image comprising the steps of:
   receiving an input image having a plurality of pixels, wherein each of the plurality of pixels have one or more pixel characteristics; and,
   processing the input image to generate an enhanced image by applying a pixel/image relationship to each of the plurality of pixels of the input image, wherein the pixel/image relationship is arranged to adjust the one or more pixel characteristics of each of the plurality of pixels of the input image;

wherein the pixel/image relationship is applied iteratively to each of the plurality of pixels in the processing step to generate the enhanced image.

2. A method for processing an image in accordance with claim 1, wherein the pixel/image relationship is associated with a relationship between the one or more of characteristics of each of the plurality of pixels of the input image and a visual presentation of the input image.

3. A method for processing an image in accordance with claim 2, wherein the one or more characteristics of each of the plurality of pixels are associated with the exposure levels of each of the plurality of pixels.

4. A method for processing an image in accordance with claim 3, wherein the pixel/image relationship includes a mapping of the one or more characteristics of each of the plurality of pixels relative to the one or more characteristics of each of the other pixels of the input image.

5. A method for processing an image in accordance with claim 4, wherein the exposure levels include tones, contrasts or color shifts of the pixel.

6. A method for processing an image in accordance with claim 1, wherein by applying the pixel/image relationship to each of the plurality of the pixels of the input image, a dynamic range of the input image is adjusted.

7. A method for processing an image in accordance with claim 1, wherein the pixel/image relationship includes at least one adjustable parameter arranged to adjust a magnitude of the application of the pixel/image relationship to each of the plurality of pixels.

8. A method for processing an image in accordance with claim 7, wherein the magnitude of the application of the pixel/image relationship applies to the one or more characteristics of each of the plurality of pixels.

9. A method for processing an image in accordance with claim 7, wherein the at least one adjustment parameter is adjustable by a learning network.

10. A method for processing an image in accordance with claim 9, wherein the learning network is a convolution neural network (CNN).

11. A method for processing an image in accordance with claim 9, wherein the learning network is trained with a reference data set.

12. A method for processing an image in accordance with claim 9, wherein the learning network is trained with one or more image quality loss processes.

13. A method for processing an image in accordance with claim 12, wherein the one or more image quality loss processes include spatial consistency loss, exposure control loss, color constancy loss, illumination smoothness loss or any combination thereof.

14. A method for processing an image in accordance with claim 12, wherein the one or more image quality loss processes are used when the reference data set is not available.

15. A method for processing an image in accordance with claim 1, wherein the image/pixel relationship is represented by $$F(I(x);\alpha)=I(x)+\alpha I(x)(1-I(x))$$

where
x denotes the pixel coordinates,
$F(I(x);a)$ is the enhanced image,
$I(x)$, $\alpha \in [-1,1]$ is the adjustable parameter and wherein each pixel is normalized to $[0,1]$.

16. A method for processing an image in accordance with claim 13, wherein the spatial consistency loss is represented by $$L_{spa} = \frac{1}{K}\sum_{i=1}^{K}\sum_{j\in\Omega(i)}(\|Y_i - Y_j\| - \|I_i - I_j\|)^2$$

where K is the number of cantered region i, $\Omega(i)$ is the four neighboring regions cantered at the region i. Y and I represent an average intensity value of a local region in the enhanced result and input image, respectively.

17. A method for processing an image in accordance with claim 13, wherein the exposure loss control is represented by:

$$L_{exp} = \frac{1}{M}\sum_{k=1}^{M}\|Y_k - E\|$$

where M represents the number of nonoverlapping local regions, Y is the average intensity value of a local region in the enhanced image.

18. A method for processing an image in accordance with claim 13, wherein the color Constancy Loss is represented by $$L_{col} = \sum_{\forall(p,q)\in\varepsilon}(J^p - J^q)^2, \varepsilon = \{R, G, B\}$$

where $J^p$ denotes the average intensity value of p channel of the enhanced result, (p,q) represents a pair of color channel.

19. A method for processing an image in accordance with claim 13, wherein the illumination smoothness loss is represented by $$L_{tv\alpha} = \frac{1}{N}\sum_{n=1}^{N}\sum_{c\in\varepsilon}(\nabla_x \alpha_n^c + \nabla_y \alpha_n^c)^2, \varepsilon = \{R, G, B\}$$

where N is the number of iterations, $\alpha$ is the curve parameter map, $\nabla_x$ and $\nabla_y$ represent the horizontal and vertical gradient operations.

20. A method for processing an image in accordance with claim 1, wherein the input image is a Standard Dynamic Range (SDR) signal and the enhanced image is a High Dynamic Range (HDR) signal.

21. A system for processing an image comprising:
an image gateway arranged to receive an input image having a plurality of pixels, wherein each of the plurality of pixels have one or more pixel characteristics; and,
an enhancement engine arranged to process the input image to generate an enhanced image by applying a pixel/image relationship to each of the plurality of pixels of the input image, wherein the pixel/image relationship is arranged to adjust the one or more pixel characteristics of each of the plurality of pixels of the input image;
wherein the pixel/image relationship is applied iteratively to each of the plurality of pixels to generate the enhanced image.

22. A system for processing an image in accordance with claim 21, wherein the pixel/image relationship is associated with a relationship between the one or more characteristics of each of the plurality of pixels of the input image and a visual presentation of the input image.

23. A system for processing an image in accordance with claim 22, wherein the one or more characteristics of each of the plurality of pixels are associated with the exposure levels of each of the plurality of pixels.

24. A method for processing an image in accordance with claim 23, wherein the pixel/image relationship includes a mapping of the one or more characteristics of each of the plurality of pixels relative to the one or more characteristics of each of the other pixels of the input image.

25. A system for processing an image in accordance with claim 24, wherein the exposure levels include tones, contrasts or color shifts of the pixel.

26. A system for processing an image in accordance with claim 21, wherein by applying the pixel/image relationship to each of the plurality of the pixels of the input image, a dynamic range of the input image is adjusted.

27. A system for processing an image in accordance with claim 21, wherein the pixel/image relationship includes at least one adjustable parameter arranged to adjust a magnitude of the application of the pixel/image relationship to each of the plurality of pixels.

28. A system for processing an image in accordance with claim 27, wherein the magnitude of the application of the pixel/image relationship applies to the one or more characteristics of each of the plurality of pixels.

29. A system for processing an image in accordance with claim 27, wherein the at least one adjustment parameter is adjustable by a learning network.

30. A system for processing an image in accordance with claim 29, wherein the learning network is a convolution neural network (CNN).

31. A system for processing an image in accordance with claim 29, wherein the learning network is trained with a reference data set.

32. A system for processing an image in accordance with claim 29, wherein the learning network is trained with one or more image quality loss processes.

33. A system for processing an image in accordance with claim 32, wherein the one or more image quality loss processes include spatial consistency loss, exposure control loss, color constancy loss, illumination smoothness loss or any combination thereof.

34. A system for processing an image in accordance with claim 32, wherein the one or more image quality loss processes are used when the reference data set is not available.

35. A method for processing an image comprising the steps of:
receiving an input image having a plurality of pixels, wherein each of the plurality of pixels have one or more pixel characteristics; and,
processing the input image to generate an enhanced image by applying a pixel/image relationship to each of the plurality of pixels of the input image, wherein the pixel/image relationship is arranged to adjust the one or more pixel characteristics of each of the plurality of pixels of the input image;
wherein a learning network is used to adjust the one or more pixel characteristics of each of the plurality of pixels of the input image, and the learning network is trained with one or more image quality loss processes including spatial consistency loss, exposure control loss, color constancy loss, illumination smoothness loss or any combination thereof.

36. A method for processing an image comprising the steps of:
receiving an input image having a plurality of pixels, wherein each of the plurality of pixels have one or more pixel characteristics; and,
processing the input image to generate an enhanced image by applying a pixel/image relationship to each of the plurality of pixels of the input image, wherein the pixel/image relationship is arranged to adjust the one or more pixel characteristics of each of the plurality of pixels of the input image;
wherein a learning network is used to adjust the one or more pixel characteristics of each of the plurality of pixels of the input image;
the learning network trained with one or more image quality loss processes when a reference data set is not available for training the learning network.

37. A method for processing an image comprising the steps of:
receiving an input image having a plurality of pixels, wherein each of the plurality of pixels have one or more pixel characteristics; and,
processing the input image to generate an enhanced image by applying a pixel/image relationship to each of the plurality of pixels of the input image, wherein the pixel/image relationship is arranged to adjust the one or more pixel characteristics of each of the plurality of pixels of the input image;
wherein the pixel/image relationship is represented by $F(I;\alpha) = I(x) + \alpha I(x)(1 - I(x))$ where
x denotes the pixel coordinates,
$F(I(x);\alpha)$ is the enhanced image,
$I(x)$, $\alpha \in [-1,1]$ is the adjustable parameter and wherein each pixel is normalized to [0,1].

* * * * *